United States Patent

[11] 3,567,125

| [72] | Inventor | Henderson D. Houghton |
| --- | --- | --- |
| | | 825 North Fifth West, Lehi, Utah 84043 |
| [21] | Appl. No. | 741,192 |
| [22] | Filed | June 28, 1968 |
| [45] | Patented | Mar. 2, 1971 |

[54] SPRAYING AND IRRIGATION EQUIPMENT
5 Claims, 6 Drawing Figs.

[52] U.S. Cl.................................................. 239/204,
239/452, 239/535, 239/602
[51] Int. Cl................................................... B05b 15/10
[50] Field of Search.......................................... 239/203,
204, 534, 535, 602, 546, 451, 452

[56] References Cited
UNITED STATES PATENTS

| 2,057,316 | 10/1936 | Rutherford.................. | 239/2X |
| 2,128,552 | 8/1938 | Rader et al. .................. | 239/204X |
| 2,338,679 | 1/1944 | Wood........................... | 239/535 |
| 2,912,111 | 11/1959 | Kovac.......................... | 239/204UX |
| 3,182,978 | 5/1965 | Reilly........................... | 239/534X |
| 3,272,436 | 9/1966 | Hunter......................... | 239/204 |
| 3,331,292 | 7/1967 | Seablom...................... | 239/203X |

FOREIGN PATENTS

| 157,428 | 5/1922 | Great Britain................ | 239/534 |

*Primary Examiner*—M. Henson Wood, Jr.
*Assistant Examiner*—Michael Y. Mar
*Attorney*—Edwin M. Thomas ABSTRACT: The equipment comprises a novel spray head unit adapted to form a fog or fine misty spray at moderate liquid pressures by reason of high internal turbulence in the approach channel to the controlled gap where the liquid is broken up. Adaptations include below-ground head units which are self-elevating and normally elevated heads designed to form a frost-preventing mist above the tops of fruit trees and other vegetation in freezing weather. The equipment is useful to form snow or ice, e.g. for ski areas, to extinguish fires, etc.

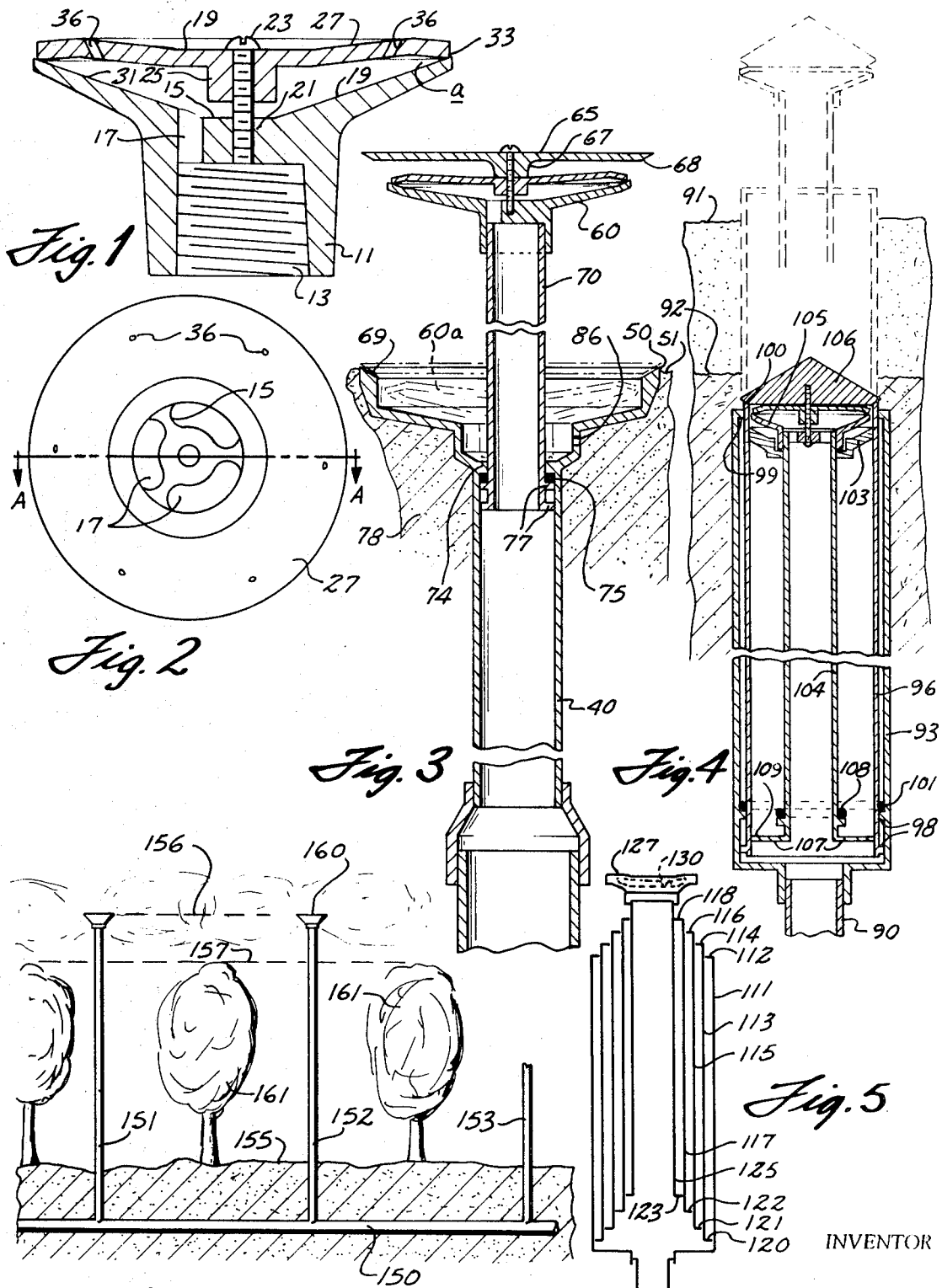

SPRAYING AND IRRIGATION EQUIPMENT

BACKGROUND AND PRIOR ART

For irrigating lawns, golf greens and the like, where projecting spray heads or sprinkler devices are objectionable, the prior art has proposed the use of movable submerged or underground spray or sprinkler heads. These are connected to a source of water supply and controlled by remote valves, etc., as is well known. Some of these devices are adapted to be adjusted in height with respect to the ground level, which may vary from time to time, depending on weather, growth, soil expansion and contraction, etc. For example, in U.S. Pat. No. 3,084,869 there is disclosed an adjustable sprinkler pipe or spray head assembly wherein an extensible inner member, sealed with respect to another tube, can be raised or lowered with respect to the outer pipe member which is fixed in position, the parts being sufficiently tightened with respect to each other as to hold them firmly against water pressure in the desired adjusted position.

In other sprinkler heads and spray devices of the prior art, the use of atomizing nozzles is of course well known and many designs have been patented and described in the literature. Most of these, however, have been engineered or formed to produce multiple small streamlets of water rather than a fine mist. As a result, they usually tend to consume larger quantities of water than are absolutely essential. Water is becoming increasingly expensive and is often unavailable in many of the more densely populated areas of the United States. This is true particularly in those areas where water supplies are necessarily limited by climate and weather conditions, as in the arid western states, for example. The economical use of water is becoming increasingly a matter of serious concern all over the world.

Also, it has been proposed in the past to employ water spray to protect orchards and other sensitive vegetation against frost, particularly in springtime when protection over a few degrees of temperature may make the difference between failure and success in large scale agricultural enterprise. The systems used in the past, so far as the present inventor is aware, have usually tended to consume undesirably large quantities of water, thus not only applying the water wastefully, and usually in areas where water supply is limited, but also applying more water to the plants, or to parts of them, than is desirable for optimum growth conditions.

While the invention is normally applicable to diffusion of water in a mist or spray, it will be understood that the head units and associated apparatus are applicable for diffusion of other fluids such as chemical sprays, fumigants, combustible gases, and aqueous and/or organic solutions of various salts and other chemicals.

It is an object of the present invention to overcome or minimize the foregoing problems and objections to prior art procedures and equipment.

BRIEF DESCRIPTION OF DRAWINGS

FIG. 1 is a vertical sectional view of one of the heads which constitutes a major aspect of the present invention, this view being taken substantially along the line A–A of FIG. 2.

FIG. 2 is a top plan view of the device of FIG. 1.

FIG. 3 is a vertical sectional view showing a sprinkler or spraying head unit, normally recessed in the ground, as used on golf courses, lawns, and the like, which is self-elevating when the water is turned on.

FIG. 4 is a vertical elevational view, in section, of another modification showing spray head or sprinkler unit which is normally buried, to project through a cultivated layer of soil when irrigation is needed.

FIG. 5 is a schematic elevational view of still another telescoping modification.

FIG. 6 is a small scale view, in elevation, of a system for preventing frost damage to orchards and other relatively tall vegetation.

DESCRIPTION OF THE PREFERRED EMBODIMENT

Referring first to FIGS. 1 and 2, the head unit, which constitutes a principle feature of the present invention, consists of a lower central liquid inlet member 11 which is threaded internally at 13 to fit on an appropriate pipe or other connection. The unit comprises an internal spider member 15 having openings 17 through which the liquid flows from the pipe which supports the head unit. The upper surface of element 11 is dish-shaped, as indicated at 19, FIG. 1, and is bored and threaded at 21 to receive a screw or bolt 23. The bolt 23 passes through the central boss 25 of an upper member 27 which is also slightly dish-shaped, as shown at 29 in its upper surface. An important feature which characterizes this head unit is the means by which a very fine mist or highly atomized spray is obtained. The lower plate is machined with a smooth surface at 31 which cooperates with an accurate corner element, which is the relatively sharp peripheral corner 33 of the upper plate member 27.

The arrangement is such that the machined element 33 of element 27 accurately matches the surface 31 of the lower unit. The parts are preferably circular, as shown in FIG. 2, but may have other shapes. The angle $a$ between the contacting peripheral parts is a substantial angle, large enough to promote high turbulence in the liquid as it flows toward the very thin edge outlet between elements 31 and 33. The angle $a$ can be varied with different types of equipment depending on the pressure, but it is essential to avoid any semblance of streamlined flow through the edge where the liquid emerges. For this reason, the angle should be more than 20° and preferably more than 30° so as to promote the turbulence just mentioned. This is a highly important aspect of this invention.

The parts 11 and 27 are made of stiff but slightly resilient material, preferably metal such as aluminum or bronze, although other materials may be used in some cases. When screw or bolt 23 is tightened, liquid flow is cut off at lower pressures. When high liquid pressure, e.g. 70 to 100 p.s.i.g. or more is applied, the parts 31, 33 separate just enough to break up the turbulent flow into a fine mist. By loosening screw 23, a coarser spray is obtained at lower pressure.

By adjusting the screw 23, the annular opening may be made as thin as desired, and preferably is of the order of about 0.001 inch for producing a fine mist. It may be somewhat more or less, depending on the pressure of the water, the area to which it is to be spread, and the type of atomization desired. The head thus is highly versatile.

With the arrangement just described, for economical irrigation, with the screw 23 tightened, a very fine mist is produced which flows out at a considerable radial distance in all directions from the head unit, but at the same time provides moisture in the area immediately surrounding the head unit.

One deficiency in many prior art sprinkler heads is that they have only a few relatively large spray outlets or openings which provide strong though small streams of water which are projected to considerable distances. These are effective for watering large areas where copious supplies of water are to be used, but the area immediately around the head often is either not irrigated at all or it is poorly and unevenly watered. A particular merit of the present invention is the way in which the fog or mist generated spreads evenly for a considerable radial distance and also covers the area in the immediate vicinity with approximately the same amount of moisture per unit of area. Tests have indicated that vegetation grows better with this type of irrigation and considerably less use of total water than with the usual systems of the prior art. For extending the watering beyond the mist area, a few conventional openings 36 may be provided if desired. These are optional and will not always be used.

The head unit of FIG. 1 can be used in various ways and in different environments, as will be explained further below. Referring now to FIG. 3, a typical lawn sprinkler arrangement is shown wherein an outer tube 40 is submerged into a lawn, its cup or dish-shaped top 50 being approximately flush with the surface 51. In its collapsed or nonextended position a sprinkler head 60, which is essentially identical with that of FIG. 1, is arranged to descend normally by gravity to the dotted line position 60a, shown in FIG. 3. A cap or cover member 65 is attached by a stem 67 to the head spray unit. This may be screwed on or fastened in any appropriate manner. It is provided with a beveled edge element 68 which fits smoothly within a beveled element 69 on the rim of the cup element 50 when the unit is in its down position, as shown by the dotted lines. In this position the cap 65 provides a smooth and reasonably tight fitting cover for the parts enclosed and rests at a position essentially even with the lawn or other surrounding ground surface.

The head unit is attached to extensible or telescoping tube or pipe 70 which is adapted to slide up and down freely within the water supply tube 40. The latter has an inturned flange 74 at the top, below which may be mounted a sealing gasket element 75. Likewise, the tube 70 has a pair of flanges 77 near its bottom which guide tube 70 as it slides within pipe 40. The arrangement is such that the device moves freely and when the tube 70 is fully elevated, the seal or gasket 75 provides a watertight fit. When the water is turned on inside of pipe 72 the flanges 77 are tightfitting enough to cause the head to rise. Thus the incoming liquid will lift the unit, although there may be some leakage permitted around the tube 70 without serious detriment. The parts should be freely slidable to assure that the head will be raised by water pressure when the water is turned on, and lowered by gravity when the water is turned off.

The gasket 75 is provided between the outer tube 40 and the inner tube 70 and may be an O-ring or equivalent. Ordinarily this O-ring is not compressed substantially and it can slide freely up and down in the annular space between tubes 70 and 40. However, when the tube 70 reaches its top position the soft O-ring is put under compression so as to form a perfectly watertight seal. It then prevents leakage of water around the pipe 70 when the head is in its fully raised position. When the water pressure is turned off, the O-ring relaxes and the tube 70 can slide down freely by gravity. The cover unit 65 on top of the head unit preferably is of sufficient weight to push the assembly down by gravity so, as soon as the water is cut off, the unit falls to its normal position at ground level. Enough leakage may be permitted around the pipe or tube 70 to allow water to escape as tube 70 descends. Alternatively, one or more small openings may be provided in the head itself to allow escape of this water. From here it may drain through an open spacer 84 into the lower part of cup 50. If desired, a small drain opening 86 may be provided in cup 50 to allow water in its upper part to soak into the surrounding soil 78. Such normally will not be necessary.

Referring next to FIG. 4, a modified multiple telescoping arrangement is shown wherein the water supply tube 90 is connected to and supports an outer tube 93 with its upper end below ground level. This unit may be buried in the ground well below the surface 91 and preferably below the lower level of cultivation 92. Fitted inside and slidable within the tube 93 is an intermediate tube member 96 which has its upper end beveled at 100 essentially like the surface 69 already described.

The tube 96 has lower external guiding flanges 98 which slide freely within the tube 93. The latter has an upper inwardly directed flange 99. A compressible seal member, shown here as O-ring 101, is provided in the annular space between the outer and intermediate tubes 93 and 96. It can float freely and a small amount of liquid can leak or pass by it when it is not compressed. The upper end of tube 96 is provided with an inner flange member 103 which acts as a guide for the central or inner tube 104 which carries the spray head 105. The spray head carries a conical cap 106 which serves as an additional weight to depress this unit to the down position where it is shown in full lines in FIG. 4.

It will be understood that when the water is turned on it will flow through openings 107 in an outer flange 109 at the bottom of tube 104. The water pressure will lift the whole slidable unit, including inner tube 104 and intermediate tube 96 to an elevated position with respect to the ground as well as to outer fixed tube 93. Flange 98 lifts O-ring 101 up against the flange 99 and compresses it there, thus forming an effective seal against water flow. Then further liquid flow starts raising inner tube 104, finally compressing O-ring 108 between a flange 110 and upper flange 103. These tubes are pushed up through the loose cultivated soil and so emerge above the surface of the ground. In this raised position the head sprays and waters the area around the unit, being raised from several inches to several feet above the ground and well above the buried tube 93 which normally encloses the spray head. When the water pressure is turned off, the tubes 96 and 104 sink by gravity to the full line position shown in FIG. 4.

The various tubes, 40 and 70 of FIG. 3, or 93, 96 and 104 of FIG. 4, may be made of any suitable material. Plastic tubing is very satisfactory and relatively inexpensive, but they may be made of aluminum, brass or other material as will be obvious.

Referring now to FIG. 5, a multiple tube telescoping system is shown schematically wherein the same principles are employed as in FIGS. 3 and 4. In order to raise the head to a higher level, several consecutive telescoping tubes are fitted, the O-ring or other suitable seals being used to shut off the flow of water. The outer tube 111 terminates in an upper flange 112 which slidable receives the next tube 113, which also has an upper flange 114. Likewise, the latter fits another smaller tube 115, having an upper flange 116, within which still another tube 117 with a top flange 118 is slidably mounted. These respective tubes 113, 115 and 117 have outwardly directed flanges 120, 121 and 122 at their bottoms. They are all arranged with suitable guiding means and with seal means, not shown, to function in the same manner as has been described in connection with the slidable elements of FIGS. 3 and 4. An inner tube 125 has a bottom flange 123 and carries the head unit 127 which may, if desired, have a cap member, not shown, of any suitable form.

In connection with the modification of FIG. 5, it may sometimes be desirable to provide supplemental holes, comparable to the holes 36 of FIG. 1, to allow the spray of liquid to cover an inner area closer to the spray head than the bulk of the mist or fog which is normally produced by the thin annular opening, under high pressure, as already described. In this way the ground can be irrigated more uniformly than without these. The streamlets issuing from the openings 130 in head 127 are used for this purpose. Thus, units of this type may be used, employing both mist and small streamlets, for large areas. By using suitable telescoping tubes, as numerous and/or as long as needed, the heads can be raised to high elevations. Obviously, multiple tubes can be raised to greater heights than the single telescoping column unit of FIG. 3, previously described. This makes it possible to cover with spray or mist a large area with a single unit and still have the unit designed to drop below the ground surface. The units described are highly satisfactory for irrigating large lawns, golf course greens and the like.

Referring next to FIG. 6, an arrangement is shown comprising a main underground water supply 150 from which a plurality of risers, 151, 152 and 153, and others not shown, may be used. The risers are projected above the ground surface 155 to a height or level 156 which should be several feet above the top level 157 of vegetation to be protected from frost. With this arrangement, and with the nozzles 160, similar to those already described, adjusted to produce a fine, thick fog, a water suspension can be made which is so finely divided that it remains essentially in suspension in the air for an extended period of time without much precipitation. As a result, the mist hangs like a low cloud over and around the vegetation, which may be fruit trees 161, or any other type of vegetation. Citrus trees, for example, are particularly susceptible to frost and can be protected at temperatures as much as 10 or 12° F. below those where killing frosts take place. By provision of a fog blanket above and around the top portions of the trees this protection can be maintained with very low expenditure of water under the principles of this invention. Substantial protection may be given to many crops. It is possible, in fact, to protect fruit trees from freezing during their critical flowering stages, etc., at temperatures as low as 20° F. or lower, by maintaining a fog blanket just above the tree levels in this manner. The fog itself may freeze, but is constantly renewed. The heat given off, that is the latent head of fusion, serves to give additional protection to the vegetation below. Thus, although fine crystals of ice may be formed and may precipitate, they are only at the freezing point of water and not below it, They will not damage the trees or other crops unless they get considerably colder. By increasing the fog rate slightly, enough liquid may be precipitated along with the ice crystals to give further protection. Thus, by a very moderate expenditure of water at ground or water system temperature, which is always a few degrees above freezing, substantial protection may be given to large areas of orchards and other installations which are to be protected, all at minimum expense.

The spray heads may be used for spraying other materials than irrigation water, such as chemicals, fumigants, etc., as will be obvious. With suitable modifications which are obvious, the system may be used to extinguish fires, maintain desired humidity levels in factories handling paper, fabrics, and the like. Many other uses are obvious.

It will be understood that various other modifications may be made within the spirit of the invention, as will be obvious to those skilled in the art. It is intended to cover such as far as the prior art properly permits by the claims which follow.

I claim:

1. A self-lifting spray head unit for sprinkling, irrigation and the like, which comprises, in combination, an upstanding outer tube member connectable directly to a pressured source of liquid supply and having an inwardly directed annular stop and guide element at its upper end, an inner tube housed and freely slidable within said outer tube and annularly spaced therefrom by said stop and guide element and by an outwardly projecting guide flange carried at the lower end of said inner tube, said inner tube also carrying a spray nozzle at its upper end and an external annular compressible sealing gasket intermediate its ends and freely movable in the annular space between said tubes, the arrangement being such that flow of liquid from a connected pressure source first lifts the inner tube to elevated position and then compresses the gasket carried by the inner tube against the stop and guide element to seal the annular space, thereby directing total flow of said liquid through the spray nozzle, said nozzle made up essentially of an opposed pair of stiff but resilient plates with their peripheral edges normally in contact but adapted to separate slightly under high liquid pressure to provide a very thin annular flow outlet for said liquid, said plates being shaped to provide a wide angle, not less than 20° for the liquid towards the outlet to cause highly turbulent flow and thereby cause the liquid to break up into a fine misty spray, wherein said two plates are adjustably secured together so that the width of the annular outlet can be adjusted.

2. Combination according to claim 1 wherein a plurality of telescoping tubes are used, one within another, to extend the height to which the spray head may be raised.

3. Combination according to claim 1 wherein the head unit is mounted within a receptacle provided with a drain to allow free descent to a nonspraying position.

4. Combination according to claim 1 wherein a weighted cover head is mounted above the head unit to push it down by gravity to a nonspraying position when the force of liquid flow is cut off.

5. Combination according to claim 1 wherein the head unit is incorporated into a frost prevention system for protecting vegetation in subfreezing temperatures, comprising a plurality of head units mounted on tall flow lines extending above the tops of the vegetation, the head units each being adjustable to provide a fine air-suspendable protecting mist of moisture of low water flow rate.